Aug. 9, 1960  H. STAMM  2,948,573
BEARING MEANS FOR THE ROTATABLE WINDING
WEIGHT OF A SELFWINDING WATCH
Filed Dec. 20, 1955
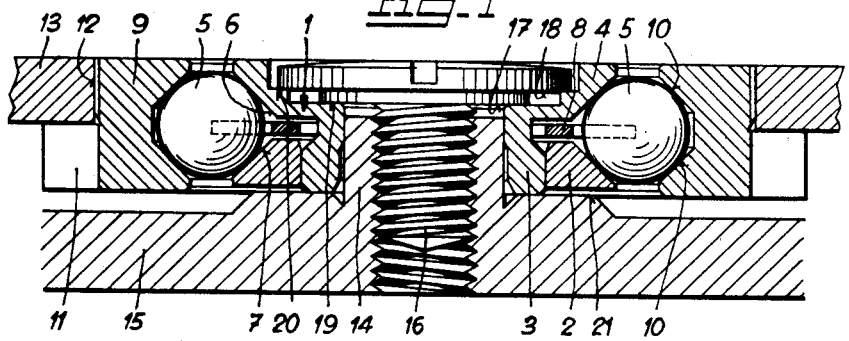
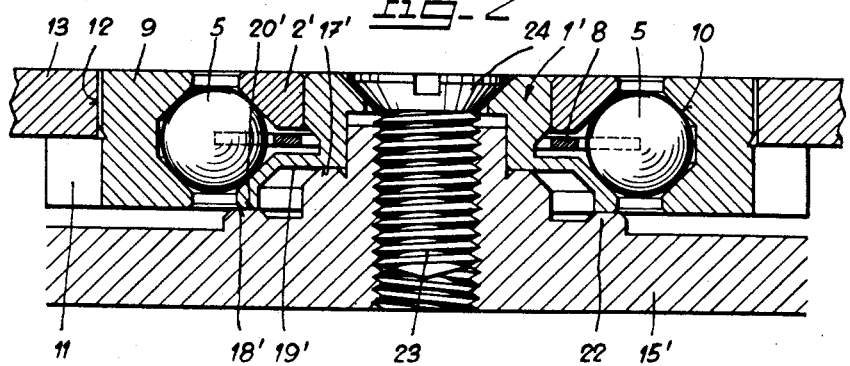
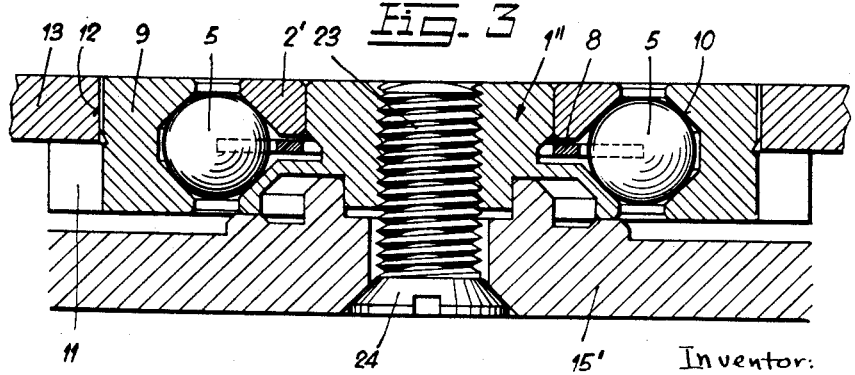
Inventor:
Heinrich Stamm
By: Michael S. Striker
agt.

United States Patent Office
2,948,573
Patented Aug. 9, 1960

2,948,573

BEARING MEANS FOR THE ROTATABLE WINDING WEIGHT OF A SELFWINDING WATCH

Heinrich Stamm, Grenchen, Switzerland, assignor to Eta A.G., Ebauchesfabrik, Grenchen, Switzerland Filed Dec. 20, 1955, Ser. No. 554,353

Claims priority, application Switzerland Dec. 22, 1954

12 Claims. (Cl. 308—197)

This invention relates to bearing means for the rotatable weight of a selfwinding watch, in particular to ball bearings, in which the outer and inner ball-races are constituted each by two opposite conical faces, and in which the inner bearing part, carrying the inner ball-race, is fixed to the selfwinding mechanism frame, whereas the outer bearing part, which carries the outer ball-race, is connected to the movable weight.

The ball bearings for the movable weight of selfwinding watch mechanisms must have a very small play, which cannot be measured at all. If the bearing play were more important, the movable weight could come in contact either with the watch movement frame or with the selfwinding mechanism frame, because the movable weight is very large with respect to the sizes of its bearing. On the other hand, too small a play would obviously block up the bearing. The play of the balls in such bearings can thus not be adjusted between so narrow limits before the outer bearing part is mounted on the winding weight. This outer bearing part is, indeed, usually pressed into a corresponding bore of the weight, and said outer bearing part is obviously deformed to such an extent by said operation that the play of the balls does certainly not remain within the very narrow limits mentioned above.

Such ball bearings must accordingly be provided with means which allow to increase or to reduce the play of the balls after mounting the bearing on the winding weight.

It will be observed moreover, that normal wearing will increase said play more and more until a new adjustment thereof will become necessary. Since every watch repairer should be able to do said adjustment, the bearing must be provided in such a manner that the adjustment of the bearing play may be done with means usually belonging to every watch repairer's equipment.

The bearing can therefore not only be provided with an axially shiftable ring for holding the balls in place, since displacing such a ring through a very small distance requires quite a particular equipment, which is not even to be found with every watch factory.

The adjusting means in question must also be provided in such a way that the play of the balls can be adjusted to the desired value after as few steps as possible.

It is therefore an object of the invention to make a bearing with an inner part consisting of a sleeve and a ring pressed thereon, said sleeve being axially held in place by a screw which thrusts it against a shoulder of the selfwinding mechanism frame, and this sleeve being provided with a yieldable wide-mouthed part, the inner ball-race thereby comprising one conical face on said wide-mouthed part and another conical face on the ring pressed on to said sleeve, said wide-mouthed sleeve part resting on a plane surface of a fixed element with respect to the selfwinding mechanism frame, and said plane surface being perpendicular to the axis of rotation of the winding weight.

Still further objects of the invention will be described hereinafter.

Three embodiments of an improved ball bearing according to the invention are represented by way of example in the drawings annexed to this specification.

In the drawings:

Figs. 1 to 3 show each an axial cross-section of one of said embodiments.

The inner part of the improved bearing represented in Fig. 1 is constituted by a sleeve 1 and a ring 2. The sleeve 1 comprises a cylindrical part 3 and a wide-mouthed resilient part 4. The ring 2 is engaged with force fit on the cylindrical part 3. The inner ball-race of the bearing balls 5 is constituted by two truncated conical faces 6 and 7. Face 6 is a portion of the outer surface of the wide-mouthed sleeve part 4, whereas face 7 is constituted by the outer surface of ring 2. A star-pointed member 8 keeps the balls 5 at the desired angular distance from one another.

The outer bearing part 9 consists of a single piece and it is provided with two inner conical faces 10 constituting the outer ball-race. A toothing 11, provided in an external rim of part 9, transmits the rotations of the outer bearing part to the selfwinding mechanism of the watch, which is not represented.

The outer bearing part 9 is pressed with force fit in a corresponding bore 12 of a winding weight 13 and the cylindrical part 3 of sleeve 1 is engaged around a tapped tubular protrusion 14 of a bridge 15, said bridge forming a part of the selfwinding mechanism frame. The sleeve 1 and the winding weight 13 are held in place around the tubular protrusion 14 by means of a screw 16. The head of the fixing screw 16 comprises two cylindrical portions of different diameters. The lower face 18 of the upper, larger head portion, as well as the lower face 17 of the lower, smaller head portion are both perpendicular to the axis of the tubular protrusion 14. When the screw 16 is screwed down, the two faces 17 and 18 are in contact with the parallel faces 19 and 20, respectively. Face 19 constitutes the end face of the cylindrical part 3, whereas face 20 is the upper face of a circular inner shoulder of the wide-mouthed sleeve part 4. By contacting face 19, the screw 16 pushes the sleeve 1 until the lower face of the cylindrical part 3 butts against the shoulder 21 of bridge 15. This screw 16 also deforms the wide-mouthed sleeve part 4 by pressing on face 20, and it urges thus this wide-mouthed sleeve part against the balls 5.

In order to assemble the bearing described, the sleeve 1 is introduced in the outer bearing part 9 and the balls 5 are set in place together with the star-pointed element 8. The ring 2 is then pressed on to the cylindrical part 3 of sleeve 1. The outer bearing part 9 is pressed into the bore 12 of the winding weight 13 only afterwards. Since the latter operation causes the outer bearing part 9 to become somewhat smaller, the ring 2 must be set on the cylindrical sleeve part 3 so that the balls 5 already have a noticeable play. The bearing play is thus adjusted only roughly by setting the ring 2 in place, while the eventual adjustment of the play is undertaken after the outer bearing part 9 has been set in the bore 12 of the winding weight 13. This last adjustment is done by milling the face 17 of the screw head. As already pointed out hereabove, the face 18 of the screw 16 is in contact with the face 20, thus yieldably deforming the wide-mouthed sleeve portion 4, and urging the conical face of the ball-race carried by this part 4 against the balls 5. It will now be observed that the deformation of this wide-mouthed part 4 is increased by milling the face 17, so that the play of the balls 5 will be reduced. If the face 17 of the screw has been milled too much so that the balls are blocked up, the face 18 of the screw head 16 need only be milled in order to correct the error.

The second embodiment of the improved bearing (represented in Fig. 2), differs from the first embodiment only by the fact that the faces 17' and 18', which correspond to faces 17 and 18, respectively, are not situated on the screw head 16, but on the upper face of bridge 15'. The face 17' fulfils here also the purpose of shoulder 21 in the first embodiment. As regards face 18', it is constituted by the upper plane face of an annular projection 22 of bridge 15'. The sleeve 1' which carries the ring 2' is also provided with two plane faces 19' and 20', which are both perpendicular to the axis of rotation of the winding weight. These faces 19' and 20' co-operate with the faces 17' and 18' in the same manner as faces 19 and 20 with faces 17 and 18 in the first embodiment.

In this second embodiment the head 24 of the screw fixing the winding weight is conical and it keeps sleeve 1' against the face 17' of a shoulder of the selfwinding mechanism frame.

In the third embodiment (Fig. 3) the fixing screw 23, 24 of the winding weight 13 is engaged from the lower face of bridge 15' in the sleeve 1". In this case the watchmaker does not disk to disassemble the winding weight 13 from the bridge 15' accidentally, if it is not necessary. If he intends for instance to remove the whole selfwinding mechanism from the watch movement, he will have to look for the screws fixing the bridge 15' on the watch movement above the usual bridges, and he will not be tempted to begin with disassembling the winding weight separately.

Tests made with bearings improved in accordance with the invention have shown that rings 2, 2' can be set roughly so that a single milling operation of the faces 17, 17' is almost ever sufficient in order to adjust the play of the balls eventually.

While three embodiments of the invention have been described with reference to the drawings, it is to be understood that various changes in the shape, sizes and arrangement of parts could be resorted to without departing from the spirit or sacrificing the advantages of the invention defined by the subjoined claims.

I claim:

1. Bearing means for the rotatable winding weight of a selfwinding watch, consisting of a selfwinding mechanism frame having a shoulder, abutting means carried by said frame and provided with a plane face perpendicular to the axis of rotation of the weight, and a ball bearing comprising an outer annular part connected to said weight and formed on its inner face with two opposite conical faces constituting the outer ball-race of said bearing, and an inner part consisting of: a sleeve fixed to said frame so as to bear axially on said shoulder, and formed with a yielding wide-mouthed portion bearing on the plane face of said abutting means, the outer surface of said wide-mouthed portion comprising a conical face; and a ring pressed on to said sleeve and having a conical outer face opposite that of said wide-mouthed portion of the sleeve so as to form the inner ball-race therewith.

2. Bearing means for the rotatable winding weight of a selfwinding watch, consisting of a selfwinding mechanism frame having a shoulder, a screw fixed to said selfwinding mechanism frame and provided with a head having two portions of different diameters, one of said head portions constituting a fixing element and the other of said head portions being provided with an abutting under plane face perpendicular to the axis of rotation of the weight, and a ball bearing comprising an outer annular part connected to said weight and formed on its inner face with two opposite conical faces constituting the outer ball-race of said bearing, and an inner part consisting of: a sleeve fixed to said frame by said fixing element of said screw so as to bear axially on said shoulder, and formed with a yielding wide-mouthed portion bearing on said abutting face of said screw, the outer surface of said wide-mouthed portion comprising a conical face; and a ring pressed on to said sleeve and having a conical outer face opposite that of said wide-mouthed portion of the sleeve so as to form the inner ball-race therewith.

3. Bearing means for the rotatable winding weight of a selfwinding watch, consisting of a selfwinding mechanism frame having a shoulder and an annular abutting projection formed with an upper plane face perpendicular to the axis of rotation of the weight, screw means fixed to said mechanism frame, and a ball bearing comprising an outer annular part connected to said weight and formed on its inner face with two rigid opposite conical faces constituting the outer ball-race of said bearing, and an inner part consisting of: a sleeve fixed by said screw means to said frame so as to bear axially on said shoulder, and formed with a resiliently yielding wide-mouthed portion bearing on the upper plane face of said annular projection, the outer surface of said wide-mouthed portion comprising a conical face; and a ring pressed onto said sleeve and having a right conical outer face opposite that of said resiliently yielding wide-mouthed portion of the sleeve so as to form the inner ball-race therewith.

4. Bearing means for the rotatable winding weight of a selfwinding watch, consisting of a selfwinding mechanism frame part having on one side a shoulder and an annular abutting projection formed with an upper plane face perpendicular to the axis of rotation of the weight, a screw fixed to said frame part, and a ball bearing comprising an outer annular part connected to said weight and formed on its inner face with two rigid opposite conical faces constituting the outer ball-race of said bearing, and an inner part consisting of: a sleeve fixed by said screw to said frame part so as to bear axially on said shoulder, said screw being engaged in said sleeve and extending through a bore of said frame part from the side thereof opposite that which carries said shoulder and said projection, said sleeve being formed with a resiliently yielding wide-mouthed portion bearing on the upper plane face of said annular projection, the outer surface of said wide-mouthed portion comprising a conical face; and a ring pressed on to said sleeve and having a rigid conical outer face opposite that of said resiliently yielding wide-mouthed portion of the sleeve so as to form the inner ball-race therewith.

5. In a bearing arrangement, in combination, a support member having a support portion; an annular ball race having a rigid body portion and two laterally projecting annular peripheral portions one of which is resilient and the other of which is rigid; a fastening member firmly and unyieldingly seating a rigid portion of said annular ball race on said support portion of said support member; and abutment means on one of said members for engaging said one resilient peripheral portion of said annular ball race when said rigid portion of said annnular ball race is firmly and unyieldingly seated on said supporting portion of said support member, thereby bending only said one resilient peripheral portion, if required, by a selected amount of deflection into a desired position.

6. In a bearing arrangement, in combination, a support member having a support portion; an annular ball race having a rigid body portion and two laterally and outwardly projecting annular peripheral portions one of which is resilient and the other of which is rigid; a fastening member firmly and unyieldingly seating a rigid portion of said annular ball race on said support portion of said support member; and abutment means on one of said members for engaging said one resilient peripheral portion of said annular ball race when said rigid portion of said annular ball race is firmly and unyieldingly seated on said supporting portion of said support member, thereby bending only said one resilient peripheral portion, if required, by a selected amount of deflection into a desired portion.

7. In a bearing arrangement, in combination, a support member having a support portion; an annular ball race having a rigid body portion and two laterally projecting annular peripheral portions one of which is resilient and the other of which is rigid; a fastening member firmly and unyieldingly seating a rigid portion of said annular ball race on said support portion of said support member; and abutment means on said fastening member for engaging said one resilient peripheral portion of said annular ball race when said rigid portion of said annular ball race is firmly and unyieldingly seated on said supporting portion of said supporting member, thereby bending only said one resilient peripheral portion, if required, by a selected amount of deflection into a desired position.

8. In a bearing arrangement, in combination, a support member having a support portion; an annular ball race having a rigid body portion and two laterally projecting annular peripheral portions one of which is resilient and the other of which is rigid; a fastening member firmly and unyieldingly seating a rigid portion of said annular ball race on said support portion of said support member; and abutment means on said support member for engaging said one resilient peripheral portion of said annular ball race when said rigid portion of said annular ball race is firmly and unyieldingly seated on said supporting portion of said support member, thereby bending only said one resilient peripheral portion, if required, by a selected amount of deflection into a desired position.

9. In a bearing arrangement, in combination, a support member having a support portion; an annular ball race having a rigid body portion and two laterally projecting annular peripheral portions one of which is resilient and the other of which is rigid; a fastening member firmly and unyieldingly seating a rigid portion of said annular ball race on said support portion of said support member; and abutment means integral with said fastening member for engaging said one resilient peripheral portion of said annular ball race when said rigid portion of said annular ball race is firmly and unyieldingly seated on said supporting portion of said support member, thereby bending only said one resilient peripheral portion, if required, by a selected amount of deflection into a desired position.

10. In a bearing arrangement, in combination, a support member having a support portion; an annular ball race having a rigid body portion and two laterally projecting annular peripheral portions one of which is resilient and the other of which is rigid; a fastening member firmly and unyieldingly seating a rigid position of said annular ball race on said support portion of said support member; and abutment means integral with said support member for engaging said one resilient peripheral portion of said annular ball race when said rigid portion of said annular ball race is firmly and unyieldingly seated on said supporting portion of said support member, thereby bending only said one resilient peripheral portion, if required, by a selected amount of deflection into a desired position.

11. In a bearing arrangement, in combination, an annular element having a deformable flange a portion of the surface of which is adapted to form part of a bearing race; and a pair of clamping members for holding said element in a clamped position, one of said members being formed with inner and outer annular abutment faces which are so constructed and arranged that when said element is held in said clamped position, said inner annular face engages said annular element in the region of the inner portions of said flange and said outer abutment face engages said flange in the region of the outer edge thereof, whereby the altitude of said flange and consequently that of the part of the race which said portion of the surface of the flange forms is a function of the relative axial position of said inner and outer abutment faces of said one member.

12. In a bearing arrangement, in combination, an annular element having a deformable flange a portion of the surface of which is adapted to form part of a bearing race; support means capable of supporting said element in a mounted position; and fastening means capable of exerting an axial force on said element for fastening the same on said support means in said mounted position, one of said means being formed with inner and outer annular abutment faces which are so contructed and arranged that when said element is fastened to said support means while in said mounted position, said inner annular face engages said annular element in the region of the inner portion of said flange and said outer abutment face engages said flange in the region of the outer edge thereof, whereby the altitude of said flange and consequently that of the part of the race which said portion of the surface of said flange forms is a function of the relative axial position of said inner and outer abutment faces of said one means.

References Cited in the file of this patent

UNITED STATES PATENTS

| | | |
|---|---|---|
| 2,028,964 | Annen | Jan. 28, 1936 |
| 2,679,440 | Annen | May 25, 1954 |